(12) United States Patent
Shirai

(10) Patent No.: US 7,576,838 B2
(45) Date of Patent: Aug. 18, 2009

(54) RADAR DEVICE

(75) Inventor: Takashi Shirai, Kasugai (JP)

(73) Assignee: OMRON Corporation, Kyoto (JP)

( * ) Notice: Subject to any disclaimer, the term of this patent is extended or adjusted under 35 U.S.C. 154(b) by 98 days.

(21) Appl. No.: 11/796,557

(22) Filed: Apr. 27, 2007

(65) Prior Publication Data

US 2008/0169969 A1 Jul. 17, 2008

(30) Foreign Application Priority Data

Apr. 27, 2006 (JP) ............................. 2006-124308

(51) Int. Cl.
*G01C 3/08* (2006.01)
*G01P 3/36* (2006.01)
(52) U.S. Cl. ........................................ 356/28; 356/5.01
(58) Field of Classification Search ................ 356/4.01, 356/5.01, 28; 342/70–72, 90, 107, 195
See application file for complete search history.

(56) References Cited

U.S. PATENT DOCUMENTS

| | | | |
|---|---|---|---|
| 6,122,040 A | 9/2000 | Arita et al. | |
| 6,202,027 B1 | 3/2001 | Alland et al. | |
| 6,356,229 B1 * | 3/2002 | Schneider | 342/70 |
| 6,763,318 B1 * | 7/2004 | Winter et al. | 702/158 |
| 7,274,436 B2 * | 9/2007 | Matsuura et al. | 356/4.01 |
| 2004/0065814 A1 | 4/2004 | Miyazaki et al. | |
| 2006/0103927 A1 * | 5/2006 | Samukawa et al. | 359/436 |

FOREIGN PATENT DOCUMENTS

| | | |
|---|---|---|
| DE | 19751004 | 5/1999 |
| DE | 19952056 | 5/2001 |
| JP | 11-142520 | 5/1999 |
| JP | 2004-125739 | 4/2004 |
| WO | WO01/11385 | 2/2001 |
| WO | WO01/73473 | 10/2001 |

* cited by examiner

*Primary Examiner*—Isam Alsomiri
(74) *Attorney, Agent, or Firm*—Weaver Austin Villeneuve & Sampson LLP

(57) ABSTRACT

A radar device has a wave projecting part for projecting pulsed electromagnetic waves to a target object in a specified direction at specified time intervals, a wave receiving part for receiving reflected waves reflected by the target object, an intensity measuring part for measuring the intensity of the reflected waves, a distance measuring part for measuring the distance to the target object based on elapsed time from when the pulsed electromagnetic waves are projected until when the reflected waves are received and also serving to determine a maximum reflection point at which the intensity of the received reflected waves is the largest, and a scanning part for varying the direction of the projected electromagnetic waves and the received reflected waves in horizontal and vertical directions respectively within a specified angular scan range. A calculating part calculates a relative speed of the target object based on the measured distance and the elapsed time and a displacement quantity between the vertical scan direction of the maximum reflection point and a vertical reference direction of the scan range by determining a time constant of a filtering calculation based on the distance to the maximum reflection point and the relative speed and carrying out the filtering calculation by using this determined time constant. A correcting part moves the scan range vertically according to this calculated displacement quantity.

4 Claims, 12 Drawing Sheets

| | | Horizontal areas | | | | | | | |
|---|---|---|---|---|---|---|---|---|---|
| | | 61 | 62 | 63 | 64 | 65 | 66 | 67 | |
| Vertical areas | 81 | ← | ← | ← | ← | ← | ← | ← | Sub scan 1 |
| | 82 | ← | ← | ← | ← | ← | ← | ← | Sub scan 2 |
| | 83 | → | → | → | → | → | → | → | Main scan 1 |
| | 84 | ← | ← | ← | ← | ← | ← | ← | Sub scan 3 |
| | 85 | ← | ← | ← | ← | ← | ← | ← | Sub scan 4 |

| Sequence | Name of scan | Scan time |
|---|---|---|
| S1 | Main scan 1 | 50ms |
| S2 | Sub scan 1 | 50ms |
| S3 | Main scan 1 | 50ms |
| S4 | Sub scan 2 | 50ms |
| S5 | Main scan 1 | 50ms |
| S6 | Sub scan 3 | 50ms |
| S7 | Main scan 1 | 50ms |
| S8 | Sub scan 4 | 50ms |

|  | | Horizontal areas | | | | | | | Scan name |
|---|---|---|---|---|---|---|---|---|---|
|  | | 61 | 62 | 63 | 64 | 65 | 66 | 67 | |
| Vertical areas | 81 |  |  |  | 10 |  |  |  | Sub scan 1 |
|  | 82 |  |  | 20 | 100 | 25 |  |  | Sub scan 2 |
|  | 83 |  |  | 90 | 150 | 100 |  |  | Main scan 1 |
|  | 84 |  |  | 150 | 200 | 160 |  |  | Sub scan 3 |
|  | 85 |  |  | 80 | 180 | 75 |  |  | Sub scan 4 |

| | | Distance between vehicles | | | | |
|---|---|---|---|---|---|---|
| | | From 0 to 3m | From 3 to 5m | From 5 to 10m | From 10 to 20m | More than 20m |
| Relative speed | From −1 to 1 km/h | 0.2 | 0.2 | 0.2 | 0.2 | 0.2 |
| | From −3 to −1 km/h<br>From 1 to 3 km/h | 0.3 | 0.3 | 0.3 | 0.2 | 0.2 |
| | From −5 to −3 km/h<br>From 3 to 5 km/h | 0.4 | 0.4 | 0.3 | 0.3 | 0.2 |
| | From −10 to −5 km/h<br>From 5 to 10 km/h | 0.5 | 0.5 | 0.4 | 0.3 | 0.3 |
| | From −20 to −10 km/h<br>From 10 to 20 km/h | 0.5 | 0.5 | 0.5 | 0.3 | 0.3 |
| | Less than −20 km/h<br>More than 20 km/h | 0.5 | 0.5 | 0.5 | 0.4 | 0.3 |

| Condition | Reason |
|---|---|
| Distance to the front-going Vehicle is less than 100m | Own vehicle may be following the front-going vehicle at a constant distance |
| Quantity of correction of optical Displace is within ±2 degrees | To eliminate the effects of instantaneous displacements of optical axis |
| Speed of own vehicle is 60 km/h or more | To reduce the effects of instantaneous displacements (Main purpose is for use on roads with few slopes or on high-speed roadways) |

Fig. 20

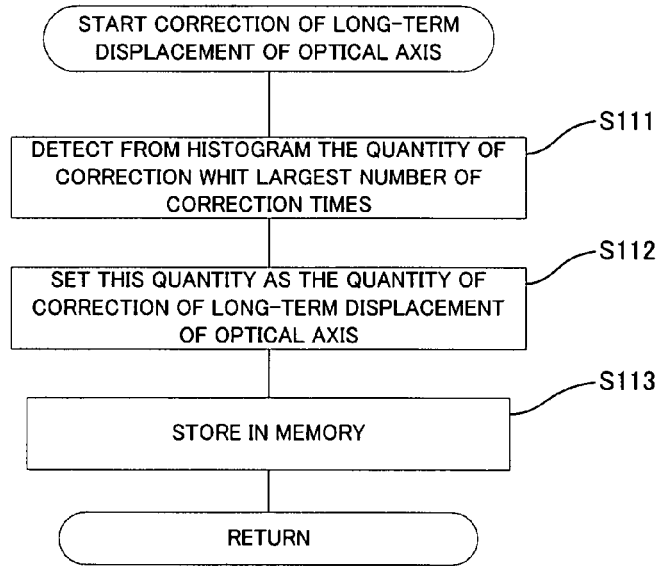

Fig. 21

RADAR DEVICE

This application claims priority on Japanese Patent Application 2006-124308 filed Apr. 27, 2006.

BACKGROUND OF THE INVENTION

This invention relates to a radar device for scanning the frontal direction with electromagnetic waves such as laser light and millimetric waves and thereby measuring the distance to an object in front based on the reflected waves therefrom.

Radar devices of the kind for scanning the frontal direction of a vehicle with laser light or the like to determine the presence or absence of an object and to measure its distance and direction have been known. Such devices are likely to erroneously detect an object due to its faulty attachment to the vehicle or the slope of the detection area caused by the condition of the load on the vehicle.

If the radar device makes an error in the detection of an object, this may cause an error in the vehicle control device connected on the downstream side. Such a vehicle control device may be carrying on an adaptive cruise control (ACC), controlling the vehicle to follow another vehicle traveling in front (the front-going vehicle) at a constant distance based on its position data measured by the radar device. If the radar device makes an error in detecting objects, the vehicle control device may decelerate or stop the vehicle when the erroneously detected distance to an object becomes less than a specified safety threshold distance.

In view of the above, Japanese Patent Publication Tokkai 2000-329853 (Reference 1) proposed a device for correcting the displacement of an optical axis based on the position of the area where the level of reflected waves becomes greater than a specified intensity and a reference direction of the scanned area. Japanese Patent Publication Tokkai 11-64489 (Reference 2) disclosed a device for calculating the displacement based on the area where the level of reflected waves becomes a maximum.

These devices, however, are adapted to make corrections while the vehicle is at rest, not while the vehicle is in motion. A device for making a correction while the vehicle is in motion is disclosed in Japanese Patent Publication Tokkai 11-142520 (Reference 3). This device is adapted to obtain a plurality of (position) data items on the front-going vehicle while it is traveling straight forward, judge its average center position (correction position) and make a correction such that the center position of the optical axis will come to coincide with this correction position.

While in motion, however, the positional relationship between one's own vehicle and its front-going vehicle keeps changing, depending on the conditions of the travel. For example, the orientation of the own vehicle would change as it accelerates and decelerates and the positional relationship of the own vehicle and the front vehicle in the vertical direction would change according the change in the condition of the road surface such as its slope.

Japanese Patent Publication Tokkai 2004-125739 (Reference 4) discloses a technology of dynamically controlling the optical axis of laser light vertically in response to changes in the vertical positional relationship while in motion. According to this technology, a scan is executed vertically in a plurality of steps and a displacement in the vertical direction is corrected by calculating the quantity of correction of displacement in the vertical direction based on the relationship between the vertical direction at which the level of reflected waves is the largest and the direction of the center of the maximum range of the scan. Since a device according to this technology relaxes an instantaneous displacement of the optical axis when a gap on the road surface causes an instantaneous vertical oscillation, a filtering process is carried out by a moving average of the calculated quantities of displacement correction.

With a device according to Reference 3, a displacement of the optical axis can be corrected even while the vehicle is in motion. With a device according to Reference 4, the correction is possible even if there is a change in the positional relationship between the own vehicle and the front-going vehicle. With these devices, however, the correction of the optical axis cannot be effected quickly enough and the front-going vehicle is lost out of sight if there is a sudden change in the distance between the own vehicle and the front-going vehicle.

If the own vehicle approached the front-going vehicle, for example, the reflector plate on the front-going vehicle comes to a position with a relatively large angle of elevation with respect to the radar device on the own vehicle such that its optical axis is moved to an upward corrected direction. If the front-going vehicle has accelerated suddenly in this situation, the laser light may come to miss the front going vehicle since its optical axis is pointing upward. With a device according to Reference 4, the process of adjusting the direction of the optical axis downward will be carried out if the laser light is on the front-going vehicle but since the calculated quantity for the correction is subjected to a filtering process in order to reduce the variations in the direction of the optical axis due to instantaneous external disturbances, the correction of the optical axis becomes delayed. If the time constant of the filter is shortened, however, there arises the problem that the device may react too sensitively to the vertical vibrations of the own vehicle.

SUMMARY OF THE INVENTION

It is therefore an object of this invention to provide radar device capable of correcting its optical axis so as not to lost sight of the front-going vehicle even if its distance from the own vehicle changes suddenly.

A radar device of this invention is comprised of a wave projecting part for projecting pulsed electromagnetic waves to a target object in a specified direction at specified time intervals, a wave receiving part for receiving reflected waves reflected by the target object in the direction of projection of the pulsed electromagnetic waves, an intensity measuring part for measuring the intensity of the reflected waves received by the wave receiving part, a distance measuring part for measuring the distance to the target object based on elapsed time from when the pulsed electromagnetic waves are projected until when the reflected waves are received and also serving to determine a maximum reflection point at which the intensity of the received reflected waves is the largest, a scanning part for varying the direction of the projected electromagnetic waves and the received reflected waves in horizontal and vertical directions respectively within a specified angular scan range, a calculating part for calculating a relative speed of the target object based on the measured distance and the elapsed time and a displacement quantity between the vertical scan direction of the maximum reflection point and a vertical reference direction of the scan range and a correcting part for moving the scan range vertically according to the calculated displacement quantity. The calculating part according to this invention calculates the displacement quantity by determining a time constant of a filtering calculation based on the distance to the maximum reflection point and the relative speed and carrying out the filtering calculation by using this determined time constant and recording the calculated displacement quantity obtained by this filtering calculation.

Thus, if the distance to the front-going vehicle as the target object is small and its relative speed is large, the filter coefficient for the filtering calculation is increased such that the displacement value obtained by the current (more recent) measurement becomes more influential and the response characteristic is improved. In other words, the optical axis can be corrected more quickly and the probability of losing sight of the front-going vehicle is reduced.

The calculating part of this invention may be further characterized as increasing the time constant by specified steps if the distance to the maximum reflecting point is less than a certain specified value and the relative speed is less than another certain specified value, based on a decrease in the distance to the maximum reflecting point and an increase in the relative speed. In other words, the filter coefficient is increased in steps as the distance to the front-going vehicle is reduced or its relative speed increases. A table may be preliminarily prepared for determining the filter coefficient according to the distance and the relative speed and the change in the filter coefficient may be effected according to such a table.

The scanning part of this invention may be adapted to move the direction of projecting the pulsed electromagnetic waves and receiving the reflected waves horizontally for each of vertical directions separated by a specified angle. In other words, the direction of projecting and receiving electromagnetic waves may be changed in steps.

In summary, the present invention has the merit of reducing the probability of losing sight of the front-going vehicle by quickly adjusting the direction of the optical axis even when the distance to the front-going vehicle changes suddenly.

BRIEF DESCRIPTION OF THE DRAWINGS

FIG. 20 is a list of conditions for adding to the histogram.

FIG. 21 is a flowchart of the process for determining the quantity of correction for a long-term displacement of the optical axis.

DETAILED DESCRIPTION OF THE INVENTION

Figure 1:
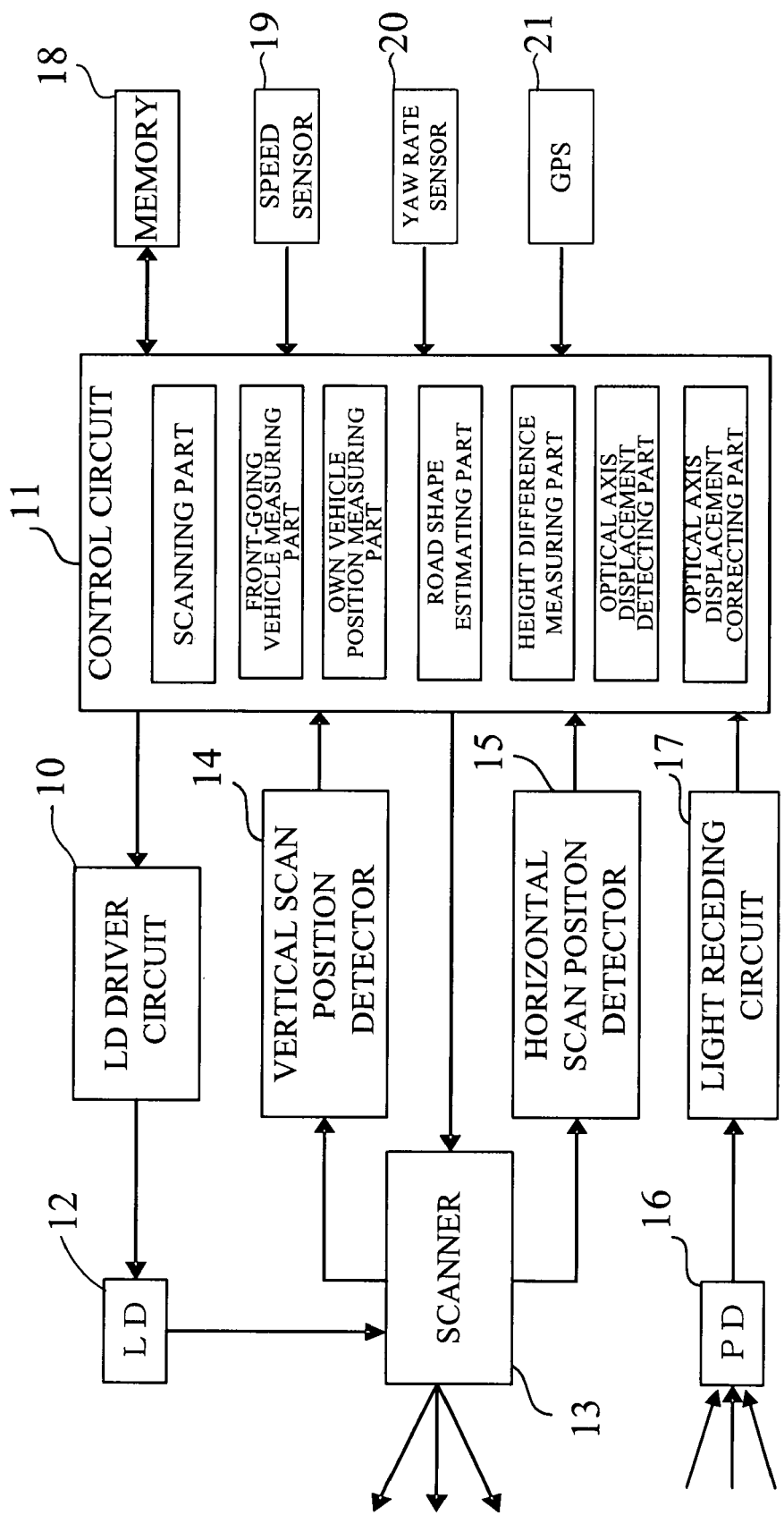
FIG. 1 is a block diagram of a laser radar device embodying this invention.

FIG. 1 is a block diagram of a laser radar device (or a distance-measuring device for a vehicle) embodying this invention. Emission of light from a laser diode (LD) 12 is controlled by a LD driver circuit 10 based on a drive signal generated by a control circuit 11. The laser light generated by the LD 12 is moved by a scanner 13 within a specified scanning range based on a control by the control circuit 11. The laser light emitted from the scanner 13 is projected forward in the direction of travel of the own vehicle 1 (FIG. 4) through a light projecting lens. A vertical scan position detector 14 and a horizontal scan position detector 15 detect respectively the vertical and horizontal scan positions of the laser light at the scanner 13 and output them to the control circuit 11.

Reflected light, which is the laser light from the scanner 13 reflected by an object (such as a vehicle) in front regarded as an object of detection, is collected by a light receiving lens and received by a photodiode (PD) 16 which outputs to a light receiving circuit 17 a signal corresponding to the received light level. The light receiving circuit 17 converts the received light level into a numerical signal and outputs it to the control circuit 11. The numerical value thus received by the control circuit 11 is stored in a memory 18 corresponding to the scan position inputted from the vertical and horizontal scan position detectors 14 and 15. The memory 18 stores also other data such as the correction of displacement of the optical axis (or the angle of projection of the light, to be set initially along the central axis of the own vehicle) and a histogram (to be explained below). The control circuit 11 is connected to a speed sensor 19, a yaw rate sensor 20 and a global positioning system (GPS) 21. The speed sensor 19 is for detecting the speed of the own vehicle. The yaw rate sensor 20 is for detecting the yaw rate of the own vehicle in the horizontal direction. The GPS is for detecting the position of the own vehicle.

The control circuit 11 calculates the distance between an object (such as the front-going vehicle) and the own vehicle based on the quantity of received light stored in the memory and the time from when the laser light was emitted until when its reflected light is received. The control circuit 11 also calculates the relative speed of the object by measuring its distance continuously in time. These calculated values are recorded in the memory 18. The control circuit 11 also serves to judge whether the detected object is a front-going vehicle or not based on its distance and relative speed. Throughout herein, the front-going vehicle means a single vehicle immediately in front, traveling in the same lane as the own vehicle.

Figure 2:
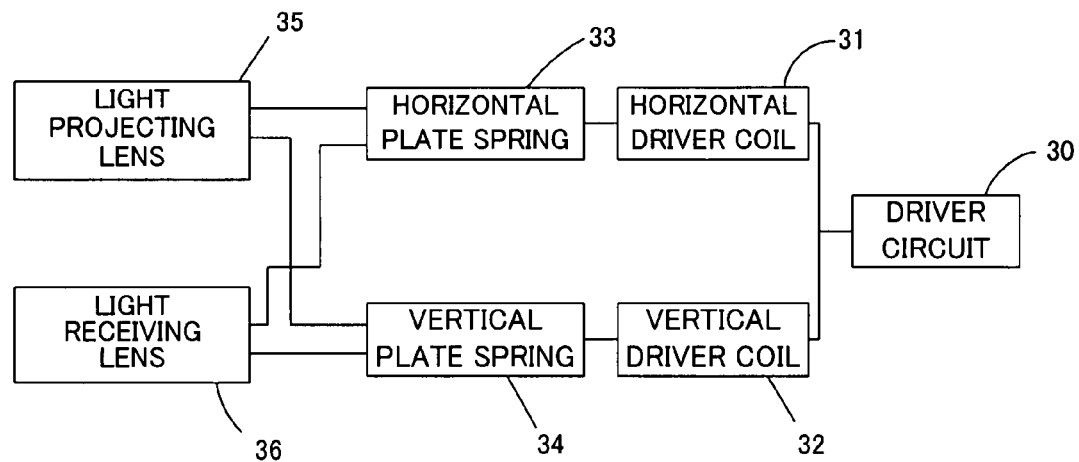
FIG. 2 is a structural diagram of the parts of the scanner supporting the light projecting and receiving lenses.

FIG. 2 shows the structure of the parts of the scanner 12 supporting the light projecting and receiving lenses. A control signal from the control circuit 11 is inputted to a driver circuit 30. The driver circuit 30 supplies driving currents to driver coils 31 and 32 for horizontal and vertical directions based on the inputted control signal. The driver coils 31 and 32 serve to move respectively in the horizontal and vertical directions supporting member (not shown) which supports the light projecting and receiving lenses 35 and 36 integrally. The supporting member is supported by plate springs 33 and 34 so as to be able to move respectively in the horizontal and vertical directions. Thus, the supporting member (and hence the light projecting and receiving lenses 35 and 16) not only moves to and comes to rest at the horizontal position where the attractive or repulsive force between the magnetic field generated in the driver coil 31 for the horizontal direction by the driving current and a permanent magnet (not shown) balances with the reaction force generated in the plate spring 33 in the horizontal direction but also moves to and comes to rest at the vertical position where the attractive or repulsive force between the magnetic field generated in the driver coil 32 for the vertical direction and another permanent magnet (not shown) balances with the reaction force generated in the plate spring 34 in the vertical direction and the gravitational force. The position of each of the lenses is detected by a sensor (not shown). Outputs from this sensor are inputted to the driver circuit 30 to form a servo mechanism. Thus, the light projecting and receiving lenses 35 and 36 can be moved to specified horizontal and vertical positions.

Figure 3:
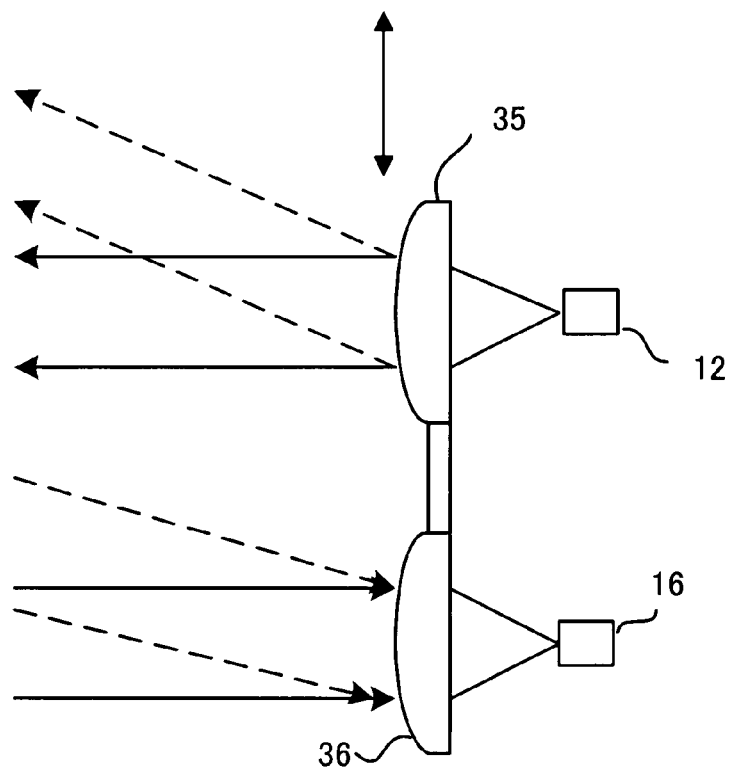
FIG. 3 is a diagram for showing the optical paths of light through the light projecting and receiving lenses.

FIG. 3 shows the optical paths of the light projecting and receiving lenses 35 and 36 projected from the scanner 13. The light projecting lens 35 is in front of the LD 12 and the light receiving lens 36 is in front of the PD 16. The laser light from the LD 12 is collected by the light projecting lens 35. If the light projecting lens 35 is at the center position for the scan, the laser light is projected to the front as shown by solid lines in FIG. 3. The projected light is reflected by an object (such as a vehicle) in front and is received by the light receiving lens 36 as shown by solid lines and by the PD 16.

If the scanner 13 moves the light projecting lens 35 upward (with respect to the figure), the laser light is projected in an upward direction (also with respect to the figure) as shown by dotted lines. If the projected light is reflected by an object in that upward direction, the reflected light is received by the light receiving lens 36 as shown by dotted lines and received by the PD 16.

Thus, the scanner 13 moves the light projecting and receiving lenses 35 and 36 together in the horizontal direction to specified positions, thereby making a horizontal scan with the laser light. The scanner 13 similarly moves the light projecting and receiving lenses 35 and 36 together in the vertical direction to make a vertical scan with the laser light.

Figure 4:
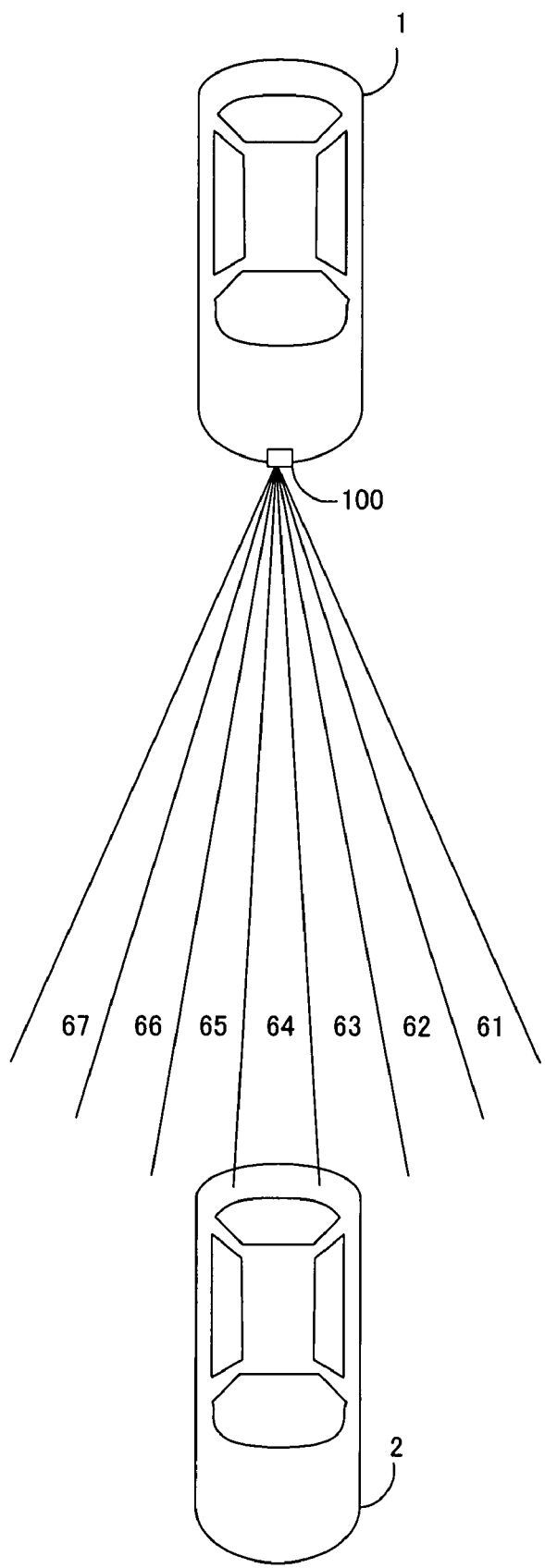
FIG. 4 shows an example of scan range in the horizontal direction when the laser radar device on the own vehicle projects laser light towards a front-going vehicle.
Figure 5:
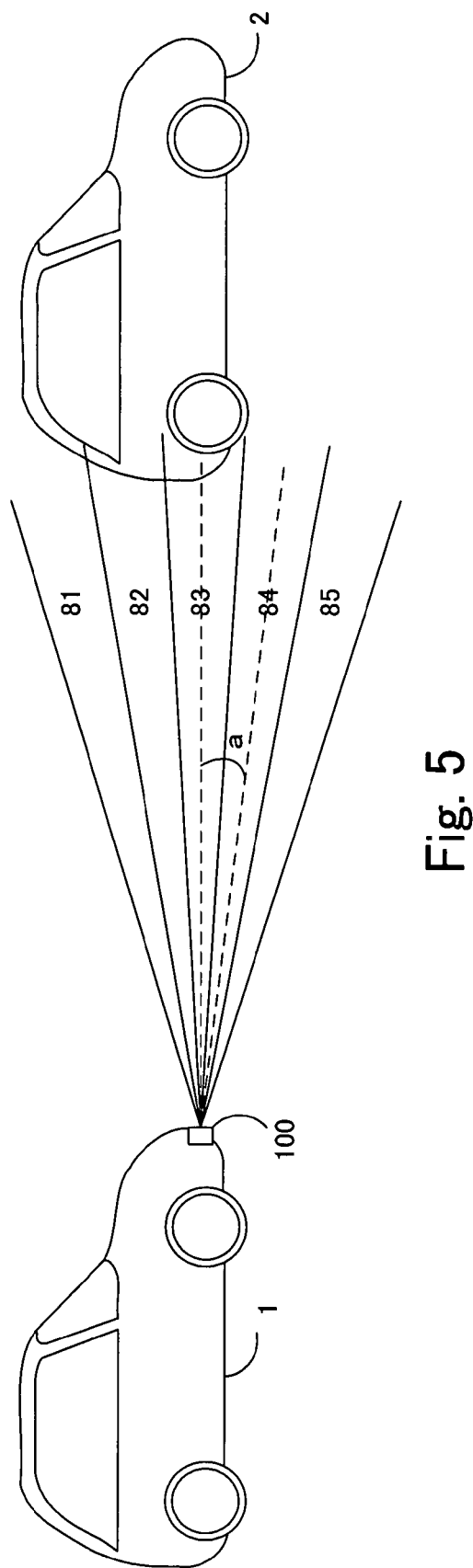
FIG. 5 shows an example of scan range in the vertical direction when the laser radar device on the own vehicle projects laser light towards a front-going vehicle.

FIGS. 4 and 5 show an example of horizontal and vertical scan ranges as a laser radar device 100 of the own vehicle 1 projects laser light towards a front-going vehicle 2. As shown in FIG. 4, the scan range in the horizontal direction is divided into seven areas 61-67. Similarly, as shown in FIG. 5, the scan range in the vertical direction is divided into five areas 81-85. In real applications, the scan ranges are actually divided into larger numbers of areas. The examples in FIGS. 4 and 5 are for simplifying the explanation.

Figures 6, 7, 10:
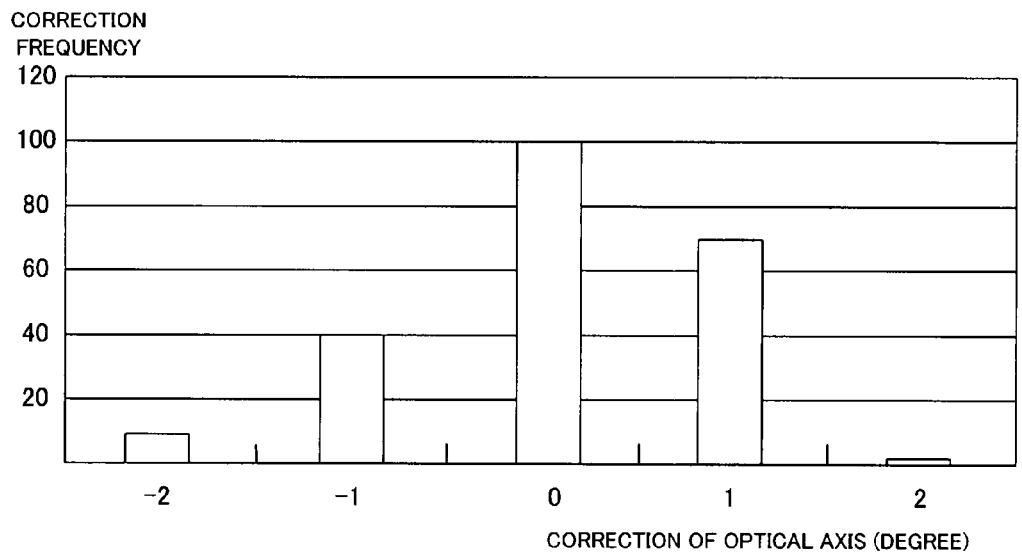
FIG. 6 shows the direction of scan by the scanner over the scan ranges shown in FIGS. 4 and 5.
FIG. 7 shows the order in which main and sub scans are carried out to scan the entire range of scan area.
FIG. 10 shows an example of histogram stored in the memory.

The scanner 13 may cause laser light to scan the scan ranges shown in FIGS. 4 and 5 as shown in FIG. 6. Vertical area 83 is the center area of the five vertically divided areas. In this area, the horizontal scan is carried out from area 61 to area 67 (referred to as the main scan 1). In vertical areas 81 and 82 above the center vertical area 83 and in vertical areas 84 and 85 below the center vertical area 83, the horizontal scan is carried out from area 67 to area 61 (referred to as the sub scans 1, 2, 3 and 4).

FIG. 7 shows the order in which the main and sub scans are carried out to scan the entire scan range. In Step 1, the scanner 13 carries out main scan 1 to scan the central vertical area 83 from area 61 to area 67. In Step S2, the scanner carries out sub scan 1 to scan vertical scan area 81 from area 67 to area 61. In Step 3, the scanner 13 carries out main scan 1 again and in Step 4, the scanner 12 carries out sub scan 2 to scan vertical scan area 82 from area 67 to area 61. In Step 5, the scanner 13 carries out main scan 1 again and in Step 6, the scanner 12 carries out sub scan 3 to scan vertical scan area 84 from area 67 to area 61. In Step 7, the scanner 13 carries out main scan 1 again and in Step 8, the scanner 12 carries out sub scan 4 to scan vertical scan area 85 from area 67 to area 61. The time required for each scan is 50 ms. The total scan including aforementioned Steps 1-8 is referred to as one set of scans.

According to this invention, displacements of the optical axis of the laser radar can be corrected not only on a short-term basis but also on a long-term basis. Displacements of the optical axis on a short-term basis means displacements due to vertical vibrations of the own vehicle when it is accelerating or decelerating and the displacements of a few seconds in duration when a front-going vehicle is traveling on a sloped road surface. Long-term displacements of the optical axis include displacements due to a tilting caused by a change in the load on the own vehicle as well as displacements as a result of a minor collision. The optical axis becomes displaced also instantaneously in the vertical direction as the own vehicle goes over a gap on the road surface but such instantaneous displacements of the optical axis are not corrected according to this invention in order to avoid erroneous detection.

Figure 8:
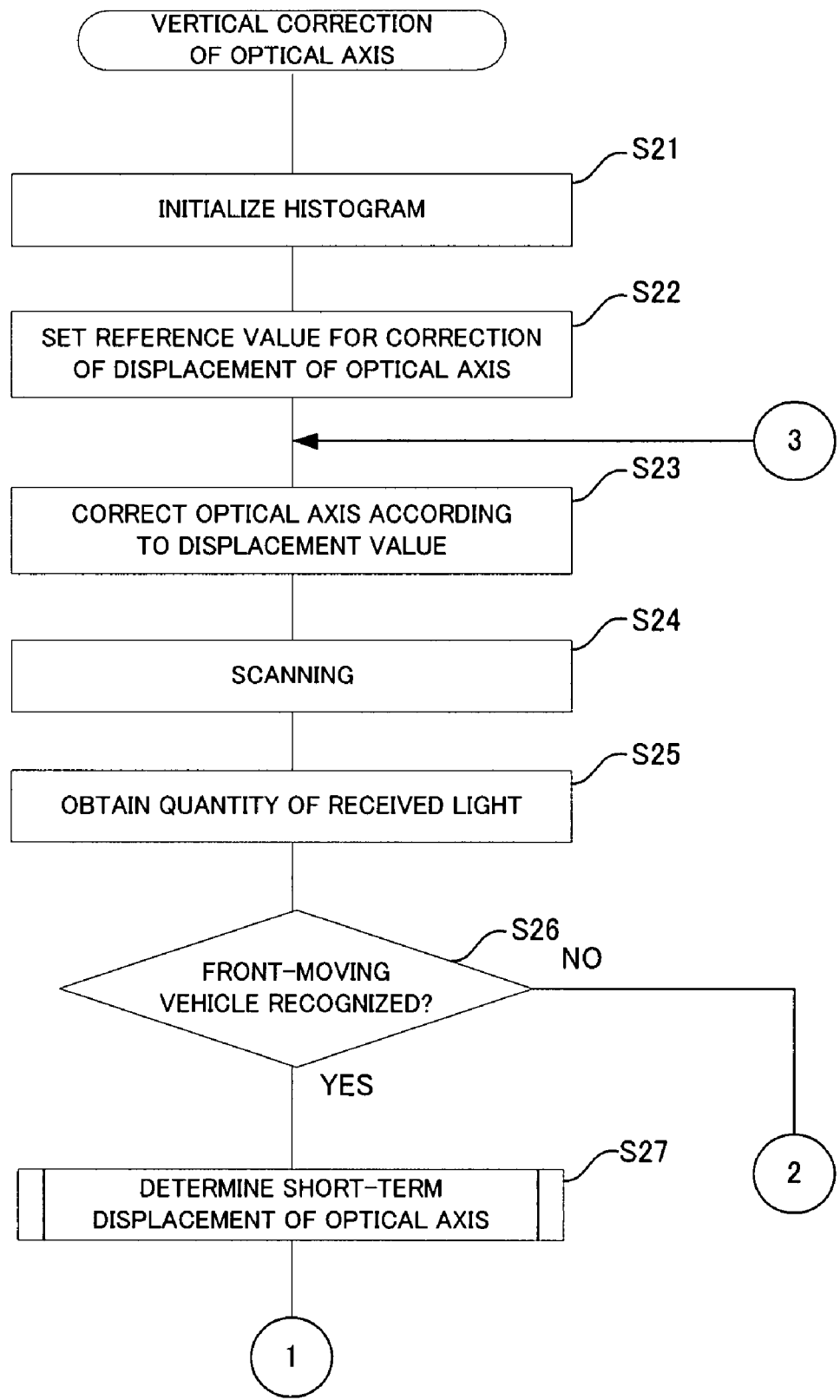
FIGS. 8 and 9 are a flowchart for the process of correcting the optical axis vertically.
Figure 9:
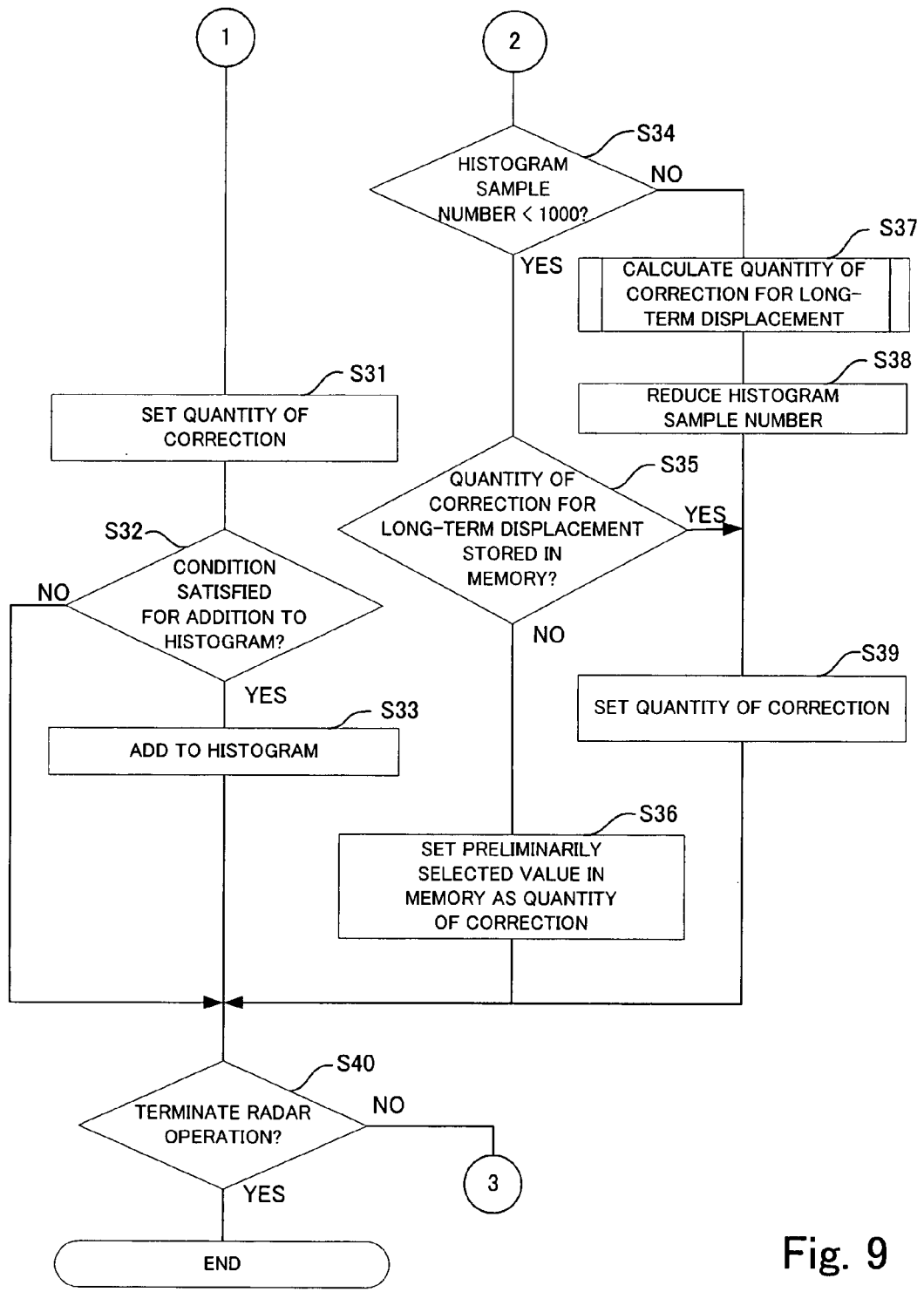

Next, FIGS. 8-21 are referenced to explain specific operations of the laser radar. FIGS. 8 and 9 are a flowchart for the process of vertical correction of the optical axis. To start, the control circuit 11 initializes the histogram stored in the memory 18 (Step S21). FIG. 10 shows an example of histogram stored in the memory 18, showing the number of times of correction on the vertical axis and the quantity of correction of the horizontal axis. In the example of FIG. 10, the frequency of correction by −2 degrees is 8 times and that by −1 degree is 40 times. No correction is made (or correction by zero degree) most frequently, or 100 times. The frequency of correction by 1 degree is 70 times. It was least frequent (twice) to make a correction by 2 degrees. The frequency values are all set to zero in Step S21.

Next, the control circuit 11 sets a reference value preliminarily determined at the time of shipment from the factory for the correction of the optical axis (Step S22). This reference value is also stored in the memory 18. Next, the control circuit 11 controls the scanner 13 to correct the optical axis according to the quantity that has been set (Step S23). This is done by supplying a control signal to the driver circuit 30 of the scanner 13 as shown in FIG. 2, supplying the correction coil 32 for the vertical direction with a current with the intensity corresponding to the control signal. The plate spring 34 in the vertical direction connected to the supporting member supporting the light projecting and receiving lenses 35 and 36 is moved by the current to the position balancing the force generated in the coil with the reaction force generated in the plate spring and the gravitational force. As a result, the vertical position of the scan range is set to the position at the time of shipment from the factory.

Examples of set position of scan range at the time of shipment from the factory are explained next with reference to FIGS. 11-13. In these examples, the movable vertical range of the scanner 13 is 20 degrees, of which a range of 4 degrees is defined as the scan range.

Figure 11:
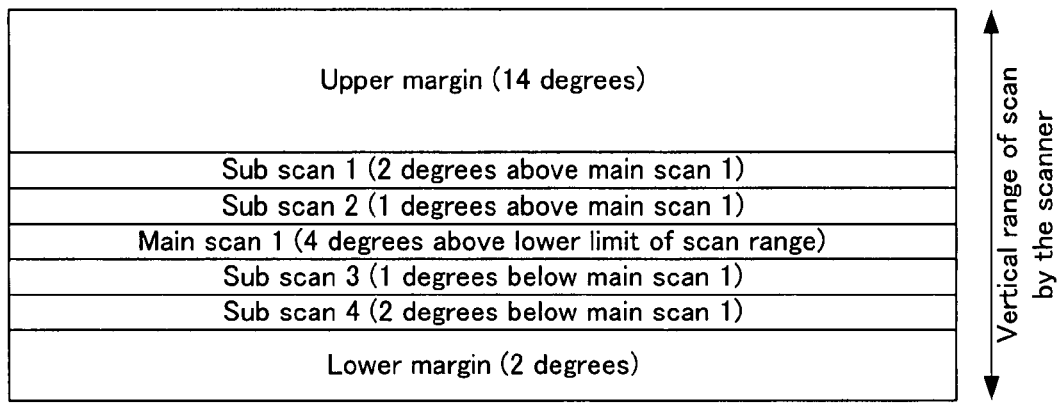
FIG. 11 shows an example of vertical position of the scan range set by the scanner when the correction is zero degrees (when the optical axis is not corrected).

FIG. 11 shows an example of vertical position of the scan range set by the scanner 13 when the correction is zero degrees (when the optical axis is not corrected). In this example, main scan 1 is set at an angular position 4 degrees above the lower limit of the vertical range of scan (approximately horizontal direction). Sub scan 2 is set 1 degree above main scan 1 and sub scan 1 is set further 1 degree above (a total of 2 degrees above main scan 1). Sub scan 3 is set one degree below main scan 1 and sub scan 4 is set further 1 degree below (a total of 2 degrees below main scan 1). There is a margin of 14 degrees above and 2 degrees below.

Figure 12:
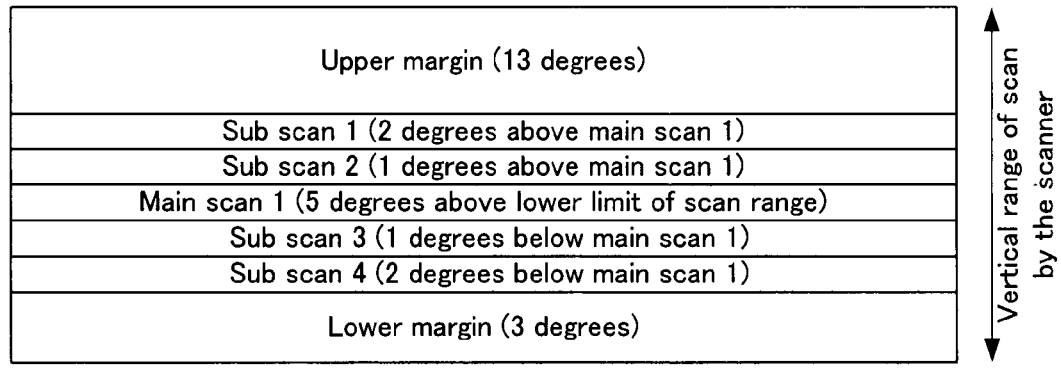
FIG. 12 shows an example of vertical position of the scan range set by the scanner when the correction is +1 degree (when the optical axis is corrected upward by 1 degree).

FIG. 12 shows an example of vertical position of the scan range set by the scanner 13 when the correction is +1 degree (when the optical is corrected upward by 1 degree). In this example, main scan 1 is set at an angular position 5 degrees above the lower limit of the vertical range of scan (approximately horizontal direction). Sub scan 2 is set 1 degree above main scan 1 as in the example of FIG. 11 and sub scan 1 is set further 1 degree above (a total of 2 degrees above main scan 1). Sub scan 3 is set one degree below main scan 1 and sub scan 4 is set further 1 degree below (a total of 2 degrees below main scan 1). There is a margin of 13 degrees above and 1 degree below.

Figure 13:
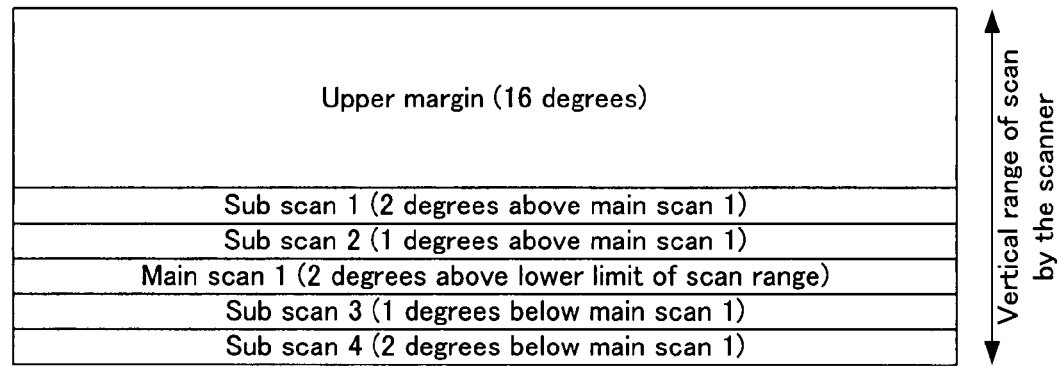
FIG. 13 shows an example of vertical position of the scan range set by the scanner when the correction is −2 degrees (when the optical axis is corrected downward by 2 degrees).

FIG. 13 shows an example of vertical position of the scan range set by the scanner 13 when the correction is −2 degrees (when the optical axis is corrected downward by 2 degrees). In this example, main scan 1 is set at an angular position 2 degrees above the lower limit of the vertical range of scan (approximately horizontal direction). Sub scan 2 is set 1 degree above main scan 1 as in the example of FIG. 11 and sub scan 1 is set further 1 degree above (a total of 2 degrees above main scan 1). Sub scan 3 is set one degree below main scan 1 and sub scan 4 is set further 1 degree below (a total of 2 degrees below main scan 1). There is a margin of 16 degrees above and 0 degree below.

In Step S24 of the flowchart of FIG. 8, the control circuit 11 controls the scanner 13 to carry out one set of scanning of the set scan range in the order and directions shown in FIGS. 6 and 7. The laser light is reflected by an object and received by the PD 16. The laser light received by the PD 16 is converted into an electrical signal and is further converted into a numerical signal by the light receiving circuit 17. The control circuit 11 receives data on the quantity of received light from the light receiving circuit 17 (Step S25).

Figures 14, 15:
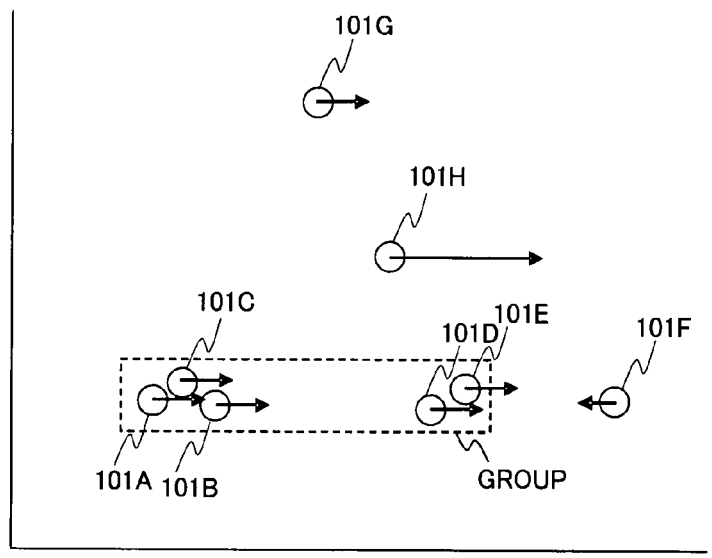
FIG. 14 shows an example of the quantity of light obtained from the light receiving circuit.
FIG. 15 is a drawing for showing how targets are grouped.

FIG. 14 is an example of the data thus received by the control circuit 11 in Step S25 from the light receiving circuit 17. In FIG. 14, no entry means that the quantity of received light was zero.

In the case of the example shown in FIG. 14, the quantity of light received from horizontal area 64 of vertical area 81 is 10. In vertical area 82, the quantity received from horizontal area 63 is 20, that from horizontal area 64 is 100 and that from horizontal area 65 is 25. In vertical area 83, the quantity received from horizontal area 63 is 90, that from horizontal area 64 is 150 and that from horizontal area 65 is 100. In vertical area 84, the quantity received from horizontal area 63 is 150, that from horizontal area 64 is 200 and that from horizontal area 65 is 160. In vertical area 85, the quantity received from horizontal area 63 is 80, that from horizontal area 64 is 180 and that from horizontal area 65 is 75.

In Step S26 of the flowchart of FIG. 8, the control circuit 11 determines whether a front-moving vehicle has been recognized or not. This determination is done as follows.

When the quantity of received light is found to be larger than a preliminarily set reference value, the control circuit 11 judges that a target object of detection is present. The detection of the target is repeated for a plural number of times successively such that the speed of motion of this target and its direction (or a displacement vector) can be obtained. Mutually adjacent targets having the same displacement vector are grouped together.

The process of grouping is explained next with reference to FIG. 15. In FIG. 15, the horizontal axis represents the detected position of each target in the horizontal direction and the vertical axis represents the distance to each detected target. Although not illustrated, the detected position and the distance to each target are compared also in vertical direction. In FIG. 15, each circle represents a detected target and each arrow indicates a displacement vector. Each displacement vector represents the distance and direction of motion of each target during the time of one scan and may be calculated from the distance between the current detection position and the previous detection position. The time of one scan may be 100 msec.

The control circuit 11 calculates the displacement vector of each target and compares them. As a result, those targets of which the displacement vectors and the distances are judged to be the same (or similar) are grouped together as belonging to the same object. FIG. 15 shows targets 101A-101H as having been detected, of which targets 101A-101E are considered to have approximately the same distance and displacement vector and hence grouped together as belonging to the same object. Target 101F is at about the same distance but since its displacement vector is different, pointing in the opposite direction, it is judged as not being the same object. Target 101G has nearly the same displacement vector as targets 101A-101E but since its distance is significantly different, it is judged as not belonging to the same object. Neither is target 101H judged as belonging to the same objects it has a different displacement vector and its distance is different.

From an assembly of targets thus grouped together, it is possible to calculate the size (or the width in the horizontal direction) of the corresponding object. From such information, the control circuit 11 judges whether the detected targets are a human, a vehicle, a roadside structure, etc., thereby carrying out the process of recognizing the kind of the object.

The control circuit 11 also serves to estimate the shape of the road in front of the own vehicle and recognizes a front-going vehicle among the objects judged to be a vehicle. The control circuit 11 estimates the shape of the road ahead based on data detected by the vehicle speed sensor 19, the yaw rate sensor 20 and the GPS 21. Any known method of estimating the road shape may be used for this purpose. If the position data of the own vehicle detected by the GPS 21 are to be used, navigation map data may also be used in a coordinated way. Alternatively, a camera may be used to obtain an image of the forward direction to estimate the shape of the road ahead. The control circuit 11 identifies the vehicle traveling immediately in front of the own vehicle in the same traffic lane as the front-going vehicle.

Figure 16:
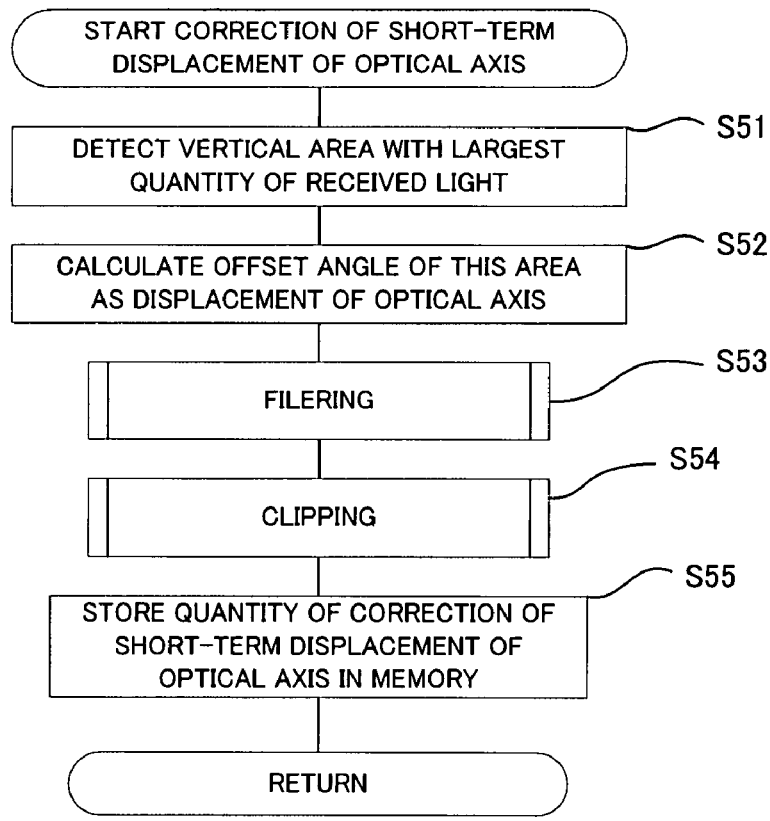
FIG. 16 is a flowchart of the process for determining the quantity of correction for a short-term displacement of the optical axis.

After a front-going vehicle has been identified as described above, the control circuit 11 determines the quantity of correction of the short-term displacement of the optical axis (Step S27). The flowchart of FIG. 16 is referenced next to explain this process.

To start, the control circuit 11 detects the vertical area where the quantity of received light is the largest (Step S51). In the case of the example of FIG. 14, vertical area 84 with the largest received quantity 200 is identified. The control circuit 11 calculates the offset angle of this vertical area (with the largest quantity of received light) as the displacement of the optical axis from the horizontal projection angle (4 degrees above the lowest limit of the scan range) of the laser of the scanner 13 (Step S52). In the case of the example of FIG. 14, since main scan 1 is set to vertical area 83, the horizontal angle of projection of the laser is vertical area 83 and its angle from the vertical area 84 with the largest quantity of received light (3 degrees above the lower limit of the scan range) is 1 degree.

Figure 17:
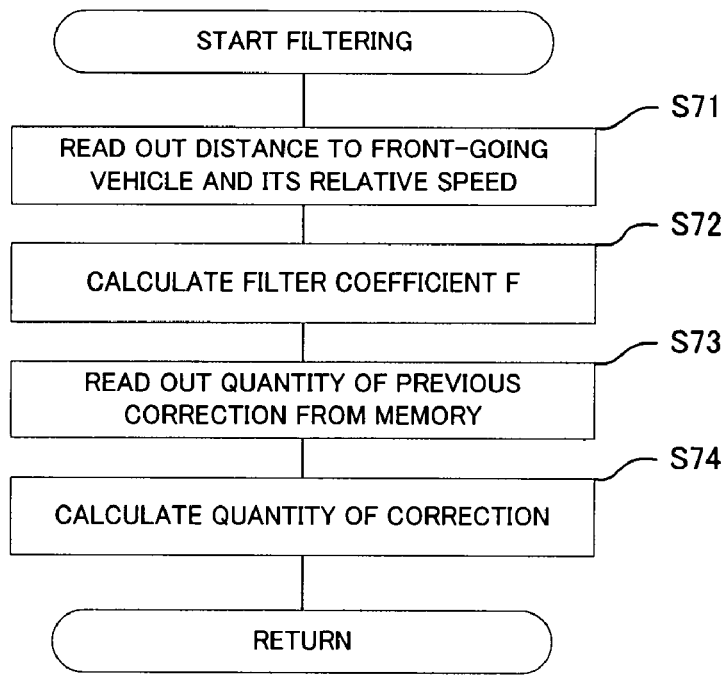
FIG. 17 is a flowchart of the filtering process.

Next, the control circuit 11 carries out the filtering process (Step S53). FIG. 17 will be referenced to explain the filtering process of the control circuit 11 in detail.

To start, the control circuit 11 reads out the distance to the front-going vehicle and its relative speed from the memory 18 (Step S71) and then calculates the filter coefficient based on the distance and the relative speed that have been read out (Step S72). The filter coefficient is determined based on a table, which will be explained below with reference to FIG. 18.

The control circuit 11 determines the filter coefficient as below based on the relative speed and the distance between the vehicles read out from the memory 18:

(1) When the relative speed is −1 km/h-1 km/h, the filter coefficient F is set equal to 0.2;

(2) When the relative speed is −3 km/h--1 km/h or 1 km/h-3 km/h, the filter coefficient is set equal to 0.3 if the distance between the vehicles is 0-3 m, 3-5 m or 5-10 m, and to 0.2 if the distance between the vehicles is 10-20 m or over 20 m;

(3) When the relative speed is −5 km/h--3 km/h or 3 km/h-5 km/h, the filter coefficient is set equal to 0.4 if the distance between the vehicles is 0-3 m or 3-5 m; to 0.3 if the distance between the vehicles is 5-10 m or 10-20 m, and to 0.2 if the distance between the vehicles is over 20 m;

(4) When the relative speed is −10 km/h--5 km/h or 5 km/h-10 km/h, the filter coefficient is set equal to 0.5 if the distance between the vehicles is 0-3 m or 3-5 m; to 0.4 if the distance between the vehicles is 5-10 m, and to 0.3 if the distance between the vehicles is 10-20 m or over 20 m;

(5) When the relative speed is −20 km/h--10 km/h or 10 km/h-20 km/h, the filter coefficient is set equal to 0.5 if the distance between the vehicles is 0-3 m, 3-5 m or 5-10 m, and to 0.3 if the distance between the vehicles is 10-20 m or over 20 m; and (6) When the relative speed is −20 km/h or less or 20 km/h or more, the filter coefficient is set equal to 0.5 if the distance between the vehicles is 0-3 m, 3-5 m or 5-10 m; to 0.4 if the distance between the vehicles is 10-20 m, and to 0.3 if the distance between the vehicles is over 20 m.

This is how the control circuit 11 sets the filter coefficient F although this method is not intended to limit the scope of the invention. A function with the distance between the vehicles and the relative speed as independent variables may be preliminarily defined and the filter coefficient may be set based of such a function.

Next, the control unit 11 reads out the quantity of previous correction of short-term displacement of the optical axis from the memory 18 (Step S73) and calculates the sum of its product with multiplicative factor (1-F) and the quantity of the current correction of short-term displacement multiplied by factor F to set as the quantity of correction of short-tern displace of the optical axis (Step S74). If the quantity of previous correction was 1 degree and that of the current correction is 4 degree and if the filter coefficient is 0.4, the value of 1.6 degrees is set as the quantity of correction of short-term displacement. For the same situation, if the filter coefficient F is 0.5, the value of 2.5 degrees is set. In other words, if the filter coefficient is larger, the effect of the quantity of the current displacement becomes greater and the response characteristic increases. Thus, when the distance between the vehicles has become small or the relative speed has increased (due to a sudden approach or a sudden separation), the optical axis can be corrected quickly and the probability of losing sight of the front-going vehicle is reduced.

Figures 18, 19:
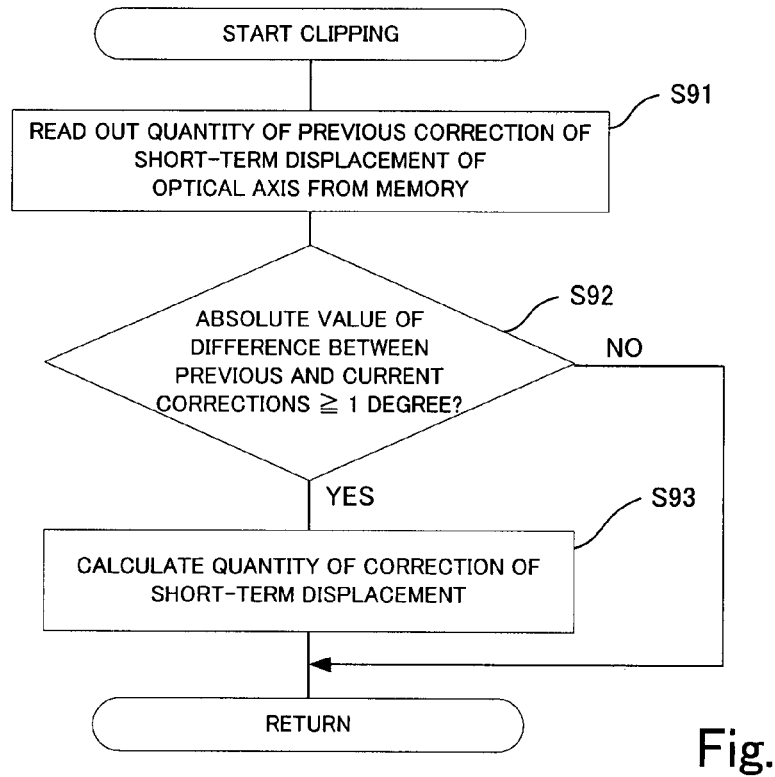
FIG. 18 shows a table for determining the filter coefficient.
FIG. 19 is a flowchart of the clipping process.

After Step S74, the control unit 11 proceeds to carry on the clipping process. The flowchart of FIG. 19 is referenced next to explain this process.

To start, the control unit 11 reads out from the memory 18 the quantity of correction of the previous short-term displacement of the optical axis (the quantity stored in Step S55 to be explained below) (Step S91) and then judges whether or not the absolute value of the difference between the quantity of correction of the current short-term displacement of the optical axis (the quantity set in Step S74 of FIG. 17) and the quantity of correction of the previous short-term displacement of the optical axis is 1 degree or larger (Step S92). If this difference is judged to be 1 degree or larger (YES in Step S92), the latter quantity is replaced by the sum of the former and their difference (Step S93). The numbers below the decimal point may be cut off or rounded off in Step S93. If the updated value exceeds the allowable range of motion, the updated value may preferably be adjusted to a value within the allowable range. The speed of adjusting the optical direction should preferably be the highest within the range allowable by the mechanical system such as the driver circuit 30 and the coil 32 for the displacement in the vertical direction.

If the difference between the quantities of correction of the current and previous short-term displacements of the optical axis is judged to be less than 1 degree (NO in Step S92), the quantity of correction is not changed and assumes the previous value.

After Step S93 or after the judgment in Step S92 turned out to be NO, the control unit 11 returns to Step S31 of FIG. 9, reading out the quantity of correction stored in the memory 18 and it is set as the quantity of correction. Next, the control unit 11 judges whether or not this quantity of correction satisfies statistical conditions for adding to the histogram (Step S32). As the process returns from Step S40 to Step S23, the vertical direction of the scan range is corrected based on this newly set quantity.

FIG. 20 shows an example of these statistical conditions. The first condition is that the distance to the front-going vehicle should be less than 100 m. This is because the own vehicle may be considered to be following the front-going vehicle at a constant speed if the distance of separation satisfies this condition. The second condition is that the absolute value of the quantity of correction of the optical axis is less than 2 degrees. This is for the purpose of eliminating the effects of instantaneous displacements of the optical axis. The third condition is that the speed of the own vehicle is 60 km/h or more. This is because the time for displacing the optical axis (say, due to a slope) is longer when the own vehicle is traveling relatively slowly and it is to minimize the effects of short-term displacements of the optical axis. The main purpose of the invention is to be used on roads with few slopes or on high-speed roadways.

If the conditions as shown in FIG. 20 are all satisfied (YES in Step S32), the quantity thus set in Step S31 is added to the histogram such as shown in FIG. 10 stored in the memory 18 (Step S33). If the quantity of correction was −1 degree, for example, the correction frequency corresponding to −1 degree is changed from 40 to 41.

If any of the required statistical conditions is not satisfied, Step S33 is skipped and the quantity of correction is not added to the histogram. Thus, unwanted effects based on short-term displacements of the optical axis are prevented from being included.

If it is judged in Step S26 that the front-going vehicle cannot be recognized, it is judged whether or not the sample number of the histogram is less than 1000 (Step S34). If the sample number of the histogram is found to be less than 1000 (YES in Step S34), the control circuit 11 judges whether or not a quantity of correction of long-term displacement of the optical axis (stored in Step 113 of FIG. 21 to be explained below) has been stored in the memory 18 (Step S35). If it is not stored in the memory 18 (NO in Step S35), a preliminarily selected value stored in the memory 18 is set as the quantity of correction of the optical displacement (Step S36).

If the sample number of the histogram is found to be not less than 1000 (NO in Step S34), the control unit 11 calculates a quantity of correction for long-term displacement of optical axis (Step S37). This process is explained next with reference to the flowchart of FIG. 21.

With reference to FIG. 21, the control unit 11 detects the quantity of correction with the largest correction frequency from the histogram (Step S111). In the case of the histogram shown in FIG. 10, the quantity of correction of zero with the largest correction frequency of 100 is detected. This quantity of correction (zero in this example) is set as the quantity of correction of long-term displacement of the optical axis (Step S112) and is stored in the memory 18 (Step S113).

Thereafter, the control unit 11 reduces the sample number of the histogram to one half (Step S38 of FIG. 9). For example, the frequency value of each quantity of correction of the displacement of the optical axis is halved. After Step S38 or after the quantity of correction of long-term displacement of the optical axis is found to be stored in the memory 18, the control unit 11 sets the quantity of correction of long-term displacement of the optical axis (Step S39). Thus, the quantity currently set in Step S112 or the quantity previously stored in the memory 18 in Step S113 is set as the quantity of correction of the displacement of the optical axis.

Thus, if the front-going vehicle is not recognized and the sample number of the histogram is 1000 or larger, the control circuit 11 determines a new quantity of correction for long-term displacement of the optical axis, and sets it as the quantity of correction.

If it is found that the conditions for adding to the histogram are not satisfied (NO in Step S32), the control circuit 11 judges whether the processing of the laser radar should be terminated according to a command from the user (Step S40) after Step S33, S36 or S39. If it is judged not to terminate (NO in Step S40), the optical axis is corrected according to the set quantity (Step S23). In other words, if the front-going vehicle is detected, the correction is based on the quantity of correction of short-term displacement. If the front-going vehicle is not detected and the sample number of the histogram is 1000 or larger, the optical axis is corrected according to the quantity of correction of long-term displacement. If the front-going vehicle is not detected and the sample number of the histogram is less than 1000, the correction is made according to a reference value in the case where the quantity of correction of previous displacement is not stored in the memory 18. In the case where the quantity of correction of previous long-term displacement is stored in the memory 18, this quantity is used to correct the optical axis. The above is repeated until a command to terminate the processing of the laser radar is given.

If the processing of the laser radar is judged to be terminated (YES in Step S40), the control circuit 11 terminates the processing.

In summary, the displacement of the optical axis is corrected such that the vertical area with the largest quantity of received light will become the center of the vertical scan range. Thus, the optical axis can be set at the optimum position even if the optical axis has been displace instantaneously due to the vibrations of the own vehicle or the vertical motion of the front-going vehicle going over a slope such that the distance to the target object can be measured accurately. Since the filtering and clipping processes are carried out in obtaining the quantity of correction, the effect on the quantity of received light due to instantaneous displacements of the optical axis can be minimized. The probability of losing sight of the front-going vehicle can be reduced by increasing the filter coefficient (by reducing the time constant of the filter) when the front-going vehicle approaches suddenly.

Even in the absence of a target object to be detected, the optical axis can be corrected based on the quantity of the previous correction of the optical axis and the histogram of the frequency of corrections such that long-term displacements (say, due to a minor collision) can be corrected.

What is claimed is:

1. A radar device comprising:
   a wave projecting part for projecting pulsed electromagnetic waves to a target object in a specified direction at specified time intervals;
   a wave receiving part for receiving reflected waves reflected by said target object in the direction of projection of said pulsed electromagnetic waves;
   an intensity measuring part for measuring the intensity of said reflected waves received by said wave receiving part;
   a distance measuring part for measuring the distance to said target object based on elapsed time from when said pulsed electromagnetic waves are projected until when said reflected waves are received, said distance measuring part serving to determine a maximum reflection point at which the intensity of said received reflected waves is the largest;
   a scanning part for varying the direction of said projected electromagnetic waves and said received reflected waves in horizontal and vertical directions respectively within a specified angular scan range;
   a calculating part for calculating a displacement quantity between the vertical scan direction of said maximum reflection point and a vertical reference direction of said scan range, determining a time constant of a filtering calculation based on the distance to said maximum reflection point and said calculated relative speed and carrying out said filtering calculation by using said determined time constant, calculating a relative speed of said target object based on a measured distance and elapsed time, and recording said calculated displacement quantity obtained by said filtering calculation; and
   a correcting part for moving said scan range vertically according to said calculated displacement quantity.

2. The radar device of claim 1 wherein said calculating part increases said time constant by specified steps if the distance to said maximum reflecting point is less than a first specified value and said relative speed is less than a second specified value, based on a decrease in the distance to said maximum reflecting point and an increase in said relative speed.

3. The radar device of claim 2 wherein said scanning part moves the direction of projecting said pulsed electromagnetic waves and receiving said reflected waves horizontally for each of vertical directions separated by a specified angle.

4. The radar device of claim 1 wherein said scanning part moves the direction of projecting said pulsed electromagnetic waves and receiving said reflected waves horizontally for each of vertical directions separated by a specified angle.

* * * * *